US012786806B2

(12) United States Patent
Chandrashekar et al.

(10) Patent No.: US 12,786,806 B2
(45) Date of Patent: Nov. 3, 2026

(54) CONFIGURATION ENHANCEMENTS FOR AN INTRA-GNB-DU INTRA-FREQUENCY L1/L2 INTER CELL CHANGE

(71) Applicant: Nokia Technologies Oy, Espoo (FI)

(72) Inventors: Subramanya Chandrashekar, Bangalore (IN); Panagiotis Spapis, Munich (DE); Ahmad Awada, Munich (DE); Halit Murat Gürsu, Munich (DE); Alperen Gundogan, Munich (DE)

(73) Assignee: Nokia Technologies Oy, Espoo (FI)

( * ) Notice: Subject to any disclaimer, the term of this patent is extended or adjusted under 35 U.S.C. 154(b) by 264 days.

(21) Appl. No.: 18/580,490

(22) PCT Filed: Aug. 1, 2022

(86) PCT No.: PCT/IB2022/057134
§ 371 (c)(1),
(2) Date: Jan. 18, 2024

(87) PCT Pub. No.: WO2023/012646
PCT Pub. Date: Feb. 9, 2023

(65) Prior Publication Data

US 2024/0334269 A1 Oct. 3, 2024

(30) Foreign Application Priority Data

Aug. 3, 2021 (IN) ............................ 202141034961

(51) Int. Cl.
*H04W 36/00* (2009.01)
*H04W 36/08* (2009.01)
*H04W 36/30* (2009.01)

(52) U.S. Cl.
CPC ... *H04W 36/0016* (2013.01); *H04W 36/0061* (2013.01); *H04W 36/0083* (2013.01); *H04W 36/305* (2018.08); *H04W 36/087* (2023.05)

(58) Field of Classification Search
CPC ........... H04W 36/0016; H04W 36/305; H04W 36/0061; H04W 36/0083; H04W 36/087
See application file for complete search history.

(56) References Cited

U.S. PATENT DOCUMENTS

2020/0229049 A1 7/2020 Wu et al.
2021/0227436 A1 * 7/2021 Zhang ............... H04W 36/0079
(Continued)

FOREIGN PATENT DOCUMENTS

WO 2019/244940 A1 12/2019
WO 2022/038308 A1 2/2022
WO 2022/207078 A1 10/2022

OTHER PUBLICATIONS

"3rd Generation Partnership Project; Technical Specification Group Radio Access Network; NR; Radio Resource Control (RRC) protocol specification (Release 16)", 3GPP TS 38.331, V16.3.1, Jan. 2021, pp. 1-932.
(Continued)

*Primary Examiner* — Charles R Craver
(74) *Attorney, Agent, or Firm* — Barta Jones, PLLC

(57) ABSTRACT

Techniques of mobility events include generating, by a gNB-CU-CP, preconfigured target cell configurations for some or all intra-frequency cells of a gNB-DU which reduces the need for subsequent F1:UE Context Modification and RRC Re-configuration procedures to configure cells of the same DU for L1/L2 mobility. Advantageously, the above-described technique for intra and inter gNB-DU mobility provides for more efficient signaling between cells belonging to the same gNB-DU.

12 Claims, 9 Drawing Sheets

(56) References Cited

U.S. PATENT DOCUMENTS

| | | | | |
|---|---|---|---|---|
| 2021/0235338 | A1* | 7/2021 | Zhang | H04W 24/08 |
| 2023/0388871 | A1* | 11/2023 | Guo | H04W 36/0069 |
| 2023/0422123 | A1* | 12/2023 | Zhang | H04W 36/18 |
| 2026/0052444 | A1* | 2/2026 | Palle Venkata | H04W 36/0055 |

OTHER PUBLICATIONS

"3rd Generation Partnership Project; Technical Specification Group Radio Access Network; NG-RAN; F1 application protocol (F1AP) (Release 16)", 3GPP TS 38.473, V16.4.0, Jan. 2021, pp. 1-461.

"3rd Generation Partnership Project; Technical Specification Group Radio Access Network; NG-RAN; Architecture description (Release 16)", 3GPP TS 38.401, V16.4.0, Jan. 2021, pp. 1-78.

"LS on TCI State Update for L1/L2-Centric Inter-Cell Mobility", 3GPP TSG RAN WG1 Meeting #104-e, R1-2102248, RAN1, Jan. 25-Feb. 5, 2021, 3 pages.

"On RAN1 LS (R1-2102248) for L1/L2 centric inter-cell mobility", 3GPP TSG-RAN WG2#113 bis-e, R2-2103823, Agenda: 8.17, Ericsson, Apr. 12-20, 2021, 19 pages.

"L1/L2-centric inter-cell mobility", 3GPP TSG-RAN WG2 Meeting #113 bis electronic, R2-2103866, Agenda: 8.17, Apple, Apr. 12-20, 2021, 7 pages.

"RAN2 impact of L1/L2-centric inter-cell mobility and inter-cell multi-TRP", 3GPP TSG-RAN WG2 Meeting #113bis-e, R2-2104116, Agenda: 8.17, Huawei, Apr. 12-20, 2021, 5 pages.

"3rd Generation Partnership Project; Technical Specification Group Radio Access Network; NR; Medium Access Control (MAC) protocol specification (Release 16)", 3GPP TS 38.321, V16.4.0, Mar. 2021, pp. 1-157.

"New WID: Further enhancements on MIMO for NR", 3GPP TSG RAN Meeting #86, RP-193133, Agenda: 9.1.1, Samsung, Dec. 9-12, 2019, 5 pages.

"[Draft] LS Reply on TCI State Update for L1/L2-Centric Inter-Cell Mobility", 3GPP TSG-RAN WG2 Meeting #114 electronic, R2-2106315, Samsung, May 19-27, 2021, pp. 1-4.

Invitation to Pay Additional Fees received for corresponding Patent Cooperation Treaty Application No. PCT/EP2022/061923, dated Sep. 6, 2022, 14 pages.

"PCR on mobility aspects to 38.401", 3GPP TSG-RAN3 Meeting # 97bis, R3-174124, Agenda: 10.10.1.6, Huawei, Oct. 9-13, 2017, 5 pages.

"Discussion on Intra-DU Inter-Cell Mobility", 3GPP TSG-RAN WG3 #97, R3-173142, Agenda: 10.10.1.6, CMCC, Aug. 21-25, 2017, 8 pages.

"PCI confusion issue", 3GPP TSG-RAN WG2 #99, R2-1708680, Agenda: 10.2.8, Nokia, Aug. 21-25, 2017, 3 pages.

"Enhancements on Multi-beam Operation", 3GPP TSG-RAN WG1 Meeting #103-e, R1-2009288, Agenda: 8.1.1, Ericsson, Oct. 26-Nov. 13, 2020, 20 pages.

International Search Report and Written Opinion received for corresponding Patent Cooperation Treaty Application No. PCT/EP2022/061923, dated Oct. 27, 2022, 23 pages.

International Search Report and Written Opinion received for corresponding Patent Cooperation Treaty Application No. PCT/IB2022/057134, dated Nov. 10, 2022, 17 pages.

"Discussions on L1/L2-centric inter-cell mobility", 3GPP TSG-RAN WG3 Meeting #112-e, R3-212510, Agenda: 8.1, Huawei, May 17-27, 2021, 4 pages.

"Discussion on L1/L2 Mobility", 3GPP TSG-RAN WG2 Meeting #113-bis-e, R2-2103079, Agenda: 8.17, Qualcomm Incorporated, Apr. 12-20, 2021, 6 pages.

* cited by examiner

CONFIGURATION ENHANCEMENTS FOR AN INTRA-GNB-DU INTRA-FREQUENCY L1/L2 INTER CELL CHANGE

RELATED APPLICATION

This application claims priority to PCT Application No. PCT/IB2022/057134, filed on Aug. 1, 2022, which claims priority to IN application No. 202141034961, filed on Aug. 3, 2021, each of which is incorporated herein by reference in its entirety.

TECHNICAL FIELD

This description relates to communications.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the 3rd Generation Partnership Project (3GPP). A recent development in this field is often referred to as the long-term evolution (LTE) of the Universal Mobile Telecommunications System (UMTS) radio-access technology. E-UTRA (evolved UMTS Terrestrial Radio Access) is the air interface of 3GPP's LTE upgrade path for mobile networks. In LTE, base stations or access points (APs), which are referred to as enhanced Node AP (eNBs), provide wireless access within a coverage area or cell. In LTE, mobile devices, or mobile stations are referred to as user equipment (UE). LTE has included a number of improvements or developments.

A global bandwidth shortage facing wireless carriers has motivated the consideration of the underutilized millimeter wave (mmWave) frequency spectrum for future broadband cellular communication networks, for example. mmWave (or extremely high frequency) may, for example, include the frequency range between 30 and 300 gigahertz (GHz). Radio waves in this band may, for example, have wavelengths from ten to one millimeters, giving it the name millimeter band or millimeter wave. The amount of wireless data will likely significantly increase in the coming years. Various techniques have been used in attempt to address this challenge including obtaining more spectrum, having smaller cell sizes, and using improved technologies enabling more bits/s/Hz. One element that may be used to obtain more spectrum is to move to higher frequencies, e.g., above 6 GHz. For fifth generation wireless systems (5G), an access architecture for deployment of cellular radio equipment employing mmWave radio spectrum has been proposed. Other example spectrums may also be used, such as cmWave radio spectrum (e.g., 3-30 GHz).

SUMMARY

According to an example implementation, a method includes generating, by a centralized unit of a network node of a network, respective indications of (i) a serving cell of a plurality of cells associated with a distributed unit of the network node, the serving cell serving a user equipment, and (ii) a subset of the plurality of cells for preparation of preconfiguration for a layer 1 based mobility procedure, the subset not including the serving cell. The method further includes transmitting, by the centralized unit, the respective indications to the distributed unit. The method further includes receiving, by the centralized unit from the distributed unit, configuration data including (i) a first radio resource control configuration for the serving cell, and (ii) a second radio resource control configuration for cells of the subset of the plurality of cells. The method further includes transmitting, by the centralized unit, the configuration data to the user equipment.

According to an example implementation, an apparatus includes at least one processor and at least one memory including computer program code, the at least one memory and the computer program code configured to, with the at least one processor, cause the apparatus at least to generate, by a centralized unit of a network node of a network, respective indications of (i) a serving cell of a plurality of cells associated with a distributed unit of the network node, the serving cell serving a user equipment, and (ii) a subset of the plurality of cells for preparation of preconfiguration for a layer 1 based mobility procedure, the subset not including the serving cell. The at least one memory and the computer program code are further configured to, with the at least one processor, cause the apparatus at least to transmit, by the centralized unit, the respective indications to the distributed unit. The at least one memory and the computer program code are further configured to, with the at least one processor, cause the apparatus at least to receive, by the centralized unit from the distributed unit, configuration data including (i) a first radio resource control configuration for the serving cell, and (ii) a second radio resource control configuration for cells of the subset of the plurality of cells. The at least one memory and the computer program code are further configured to, with the at least one processor, cause the apparatus at least to transmit, by the centralized unit, the configuration data to the user equipment.

According to an example implementation, an apparatus includes means for generating, by a centralized unit of a network node of a network, respective indications of (i) a serving cell of a plurality of cells associated with a distributed unit of the network node, the serving cell serving a user equipment, and (ii) a subset of the plurality of cells for preparation of preconfiguration for a layer 1 based mobility procedure, the subset not including the serving cell. The apparatus also includes means for transmitting, by the centralized unit, the respective indications to the distributed unit. The apparatus further includes means for receiving, by the centralized unit from the distributed unit, configuration data including (i) a first radio resource control configuration for the serving cell, and (ii) a second radio resource control configuration for cells of the subset of the plurality of cells. The apparatus further includes means for transmitting, by the centralized unit, the configuration data to the user equipment.

According to an example implementation, a computer program product includes a computer-readable storage medium and storing executable code that, when executed by at least one data processing apparatus, is configured to cause the at least one data processing apparatus to generate, by a centralized unit of a network node of a network, respective indications of (i) a serving cell of a plurality of cells associated with a distributed unit of the network node, the serving cell serving a user equipment, and (ii) a subset of the plurality of cells for preparation of preconfiguration for a layer 1 based mobility procedure, the subset not including the serving cell. The executable code, when executed by at least one data processing apparatus, is also configured to cause the at least one data processing apparatus to transmit, by the centralized unit, the respective indications to the distributed unit. The executable code, when executed by at least one data processing apparatus, is also configured to cause the at least one data processing apparatus to receive, by the centralized unit from the distributed unit, configuration data including (i) a first radio resource control configuration for the serving cell, and (ii) a second radio resource control configuration for cells of the subset of the plurality of cells. The executable code, when executed by at least one data processing apparatus, is also configured to cause the at least one data processing apparatus to transmit, by the centralized unit, the configuration data to the user equipment.

According to an example implementation, a method includes receiving, by a distributed unit of a network node of a network from a centralized unit of the network node, indication data including respective indications of (i) a serving cell of a plurality of cells associated with the distributed unit, the serving cell serving a user equipment, and (ii) a subset of the plurality of cells for preparation of preconfiguration for a layer 1 based mobility procedure, the subset not including the serving cell. The method further includes generating, by the distributed unit, configuration data including (i) a first radio resource control configuration for the serving cell, and (ii) a second radio resource control configuration for cells of the subset of the plurality of cells. The method further includes transmitting, by the distributed unit, the configuration data to the centralized unit.

According to an example implementation, an apparatus includes at least one processor and at least one memory including computer program code, the at least one memory and the computer program code configured to, with the at least one processor, cause the apparatus at least to receive, by a distributed unit of a network node of a network from a centralized unit of the network node, indication data including respective indications of (i) a serving cell of a plurality of cells associated with the distributed unit, the serving cell serving a user equipment, and (ii) a subset of the plurality of cells for preparation of preconfiguration for a layer 1 based mobility procedure, the subset not including the serving cell. The at least one memory and the computer program code are further configured to generate, by the distributed unit, configuration data including (i) a first radio resource control configuration for the serving cell, and (ii) a second radio resource control configuration for cells of the subset of the plurality of cells. The at least one memory and the computer program code are further configured to transmit, by the distributed unit, the configuration data to the centralized unit.

According to an example implementation, an apparatus includes means for receiving, by a distributed unit of a network node of a network from a centralized unit of the network node, indication data including respective indications of (i) a serving cell of a plurality of cells associated with the distributed unit, the serving cell serving a user equipment, and (ii) a subset of the plurality of cells for preparation of preconfiguration for a layer 1 based mobility procedure, the subset not including the serving cell. The apparatus also includes means for generating, by the distributed unit, configuration data including (i) a first radio resource control configuration for the serving cell, and (ii) a second radio resource control configuration for cells of the subset of the plurality of cells. The apparatus further includes means for transmitting, by the distributed unit, the configuration data to the centralized unit.

According to an example implementation, a computer program product includes a computer-readable storage medium and storing executable code that, when executed by at least one data processing apparatus, is configured to cause the at least one data processing apparatus to receive, by a distributed unit of a network node of a network from a centralized unit of the network node, indication data including respective indications of (i) a serving cell of a plurality of cells associated with the distributed unit, the serving cell serving a user equipment, and (ii) a subset of the plurality of cells for preparation of preconfiguration for a layer 1 based mobility procedure, the subset not including the serving cell. The executable code, when executed by at least one data processing apparatus, is also configured to cause the at least one data processing apparatus to generate, by the distributed unit, configuration data including (i) a first radio resource control configuration for the serving cell, and (ii) a second radio resource control configuration for cells of the subset of the plurality of cells. The executable code, when executed by at least one data processing apparatus, is also configured to cause the at least one data processing apparatus to transmit, by the distributed unit, the configuration data to the centralized unit.

According to an example implementation, a method includes transmitting, by a user equipment to a network node, a request to form a radio resource control connection. The method further includes receiving, by the user equipment from the network node, radio resource control reconfiguration data, the radio resource control reconfiguration data including target cell configurations for a plurality of cells served by a distributed unit of the network node to enable execution of a layer 1 based mobility procedure.

According to an example implementation, an apparatus includes at least one processor and at least one memory including computer program code, the at least one memory and the computer program code configured to, with the at least one processor, cause the apparatus at least to transmit, by a user equipment to a network node, a request to form a radio resource control connection. The at least one memory and the computer program code are further configured to receive, by the user equipment from the network node, radio resource control reconfiguration data, the radio resource control reconfiguration data including target cell configurations for a plurality of cells served by a distributed unit of the network node to enable execution of a layer 1 based mobility procedure.

According to an example implementation, an apparatus includes means for transmitting, by a user equipment to a network node, a request to form a radio resource control connection. The apparatus also includes means for receiving, by the user equipment from the network node, radio resource control reconfiguration data, the radio resource control reconfiguration data including target cell configurations for a plurality of cells served by a distributed unit of the network node to enable execution of a layer 1 based mobility procedure.

According to an example implementation, a computer program product includes a computer-readable storage medium and storing executable code that, when executed by at least one data processing apparatus, is configured to cause the at least one data processing apparatus to transmit, by a user equipment to a network node, a request to form a radio resource control connection. The executable code, when executed by at least one data processing apparatus, is also configured to cause the at least one data processing apparatus to receive, by the user equipment from the network node, radio resource control reconfiguration data, the radio resource control reconfiguration data including target cell configurations for a plurality of cells served by a distributed unit of the network node to enable execution of a layer 1 based mobility procedure.

The details of one or more examples of implementations are set forth in the accompanying drawings and the description below. Other features will be apparent from the description and drawings, and from the claims.

DETAILED DESCRIPTION

The principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

The terminology used herein is for the purpose of describing particular embodiments only and is not intended to be limiting of example embodiments. As used herein, the singular forms “a”, “an” and “the” are intended to include the plural forms as well, unless the context clearly indicates otherwise. It will be further understood that the terms “comprises”, “comprising”, “has”, “having”, “includes” and/or “including”, when used herein, specify the presence of stated features, elements, and/or components etc., but do not preclude the presence or addition of one or more other features, elements, components and/or combinations thereof.

Figure 1:
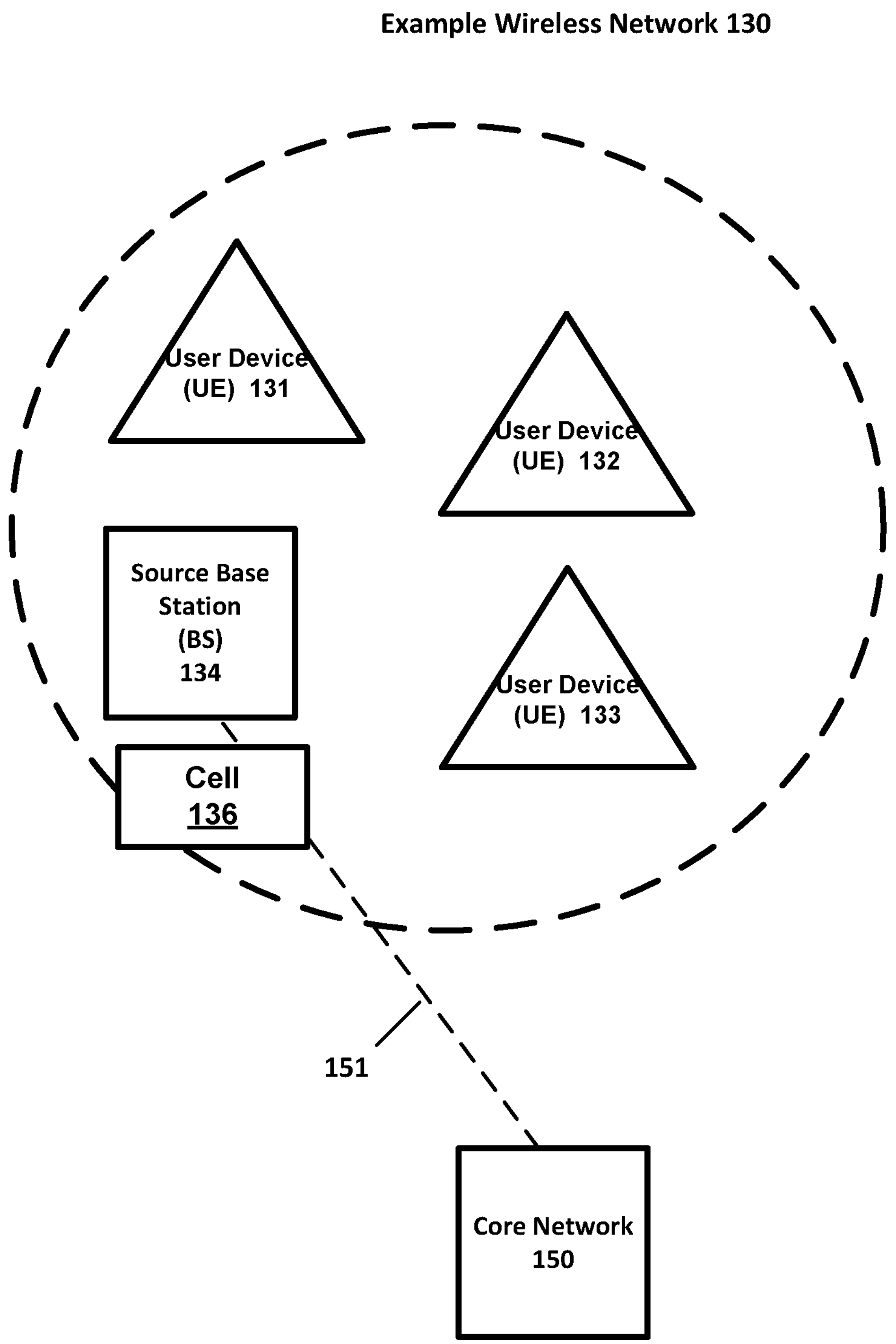
FIG. 1 is a block diagram of a digital communications network according to an example implementation.

FIG. 1 is a block diagram of a digital communications system such as a wireless network 130 according to an example implementation. In the wireless network 130 of FIG. 1, user devices 131, 132, and 133, which may also be referred to as mobile stations (MSs) or user equipment (UEs), may be connected (and in communication) with a base station (BS) 134, which may also be referred to as an access point (AP), an enhanced Node B (eNB), a gNB (which may be a 5G base station) or a network node. At least part of the functionalities of an access point (AP), base station (BS) or (e) Node B (eNB) also may be carried out by any node, server or host which may be operably coupled to a transceiver, such as a remote radio head. BS (or AP) 134 provides wireless coverage within a cell 136, including the user devices 131, 132 and 133. Although only three user devices are shown as being connected or attached to BS 134, any number of user devices may be provided. BS 134 is also connected to a core network 150 via an interface 151. This is merely one simple example of a wireless network, and others may be used.

A user device (user terminal, user equipment (UE)) may refer to a portable computing device that includes wireless mobile communication devices operating with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, a vehicle, and a multimedia device, as examples. It should be appreciated that a user device may also be a nearly exclusive uplink only device, of which an example is a camera or video camera loading images or video clips to a network.

In LTE (as an example), core network 150 may be referred to as Evolved Packet Core (EPC), which may include a mobility management entity (MME) which may handle or assist with mobility/serving cell change of user devices between BSs, one or more gateways that may forward data and control signals between the BSs and packet data networks or the Internet, and other control functions or blocks.

The various example implementations may be applied to a wide variety of wireless technologies, wireless networks, such as LTE, LTE-A, 5G (New Radio, or NR), cmWave, and/or mmWave band networks, or any other wireless network or use case. LTE, 5G, cmWave and mm Wave band networks are provided only as illustrative examples, and the various example implementations may be applied to any wireless technology/wireless network. The various example implementations may also be applied to a variety of different applications, services or use cases, such as, for example, ultra-reliability low latency communications (URLLC), Internet of Things (IoT), time-sensitive communications (TSC), enhanced mobile broadband (eMBB), massive machine type communications (MMTC), vehicle-to-vehicle (V2V), vehicle-to-device, etc. Each of these use cases, or types of UEs, may have its own set of requirements.

Figure 2:
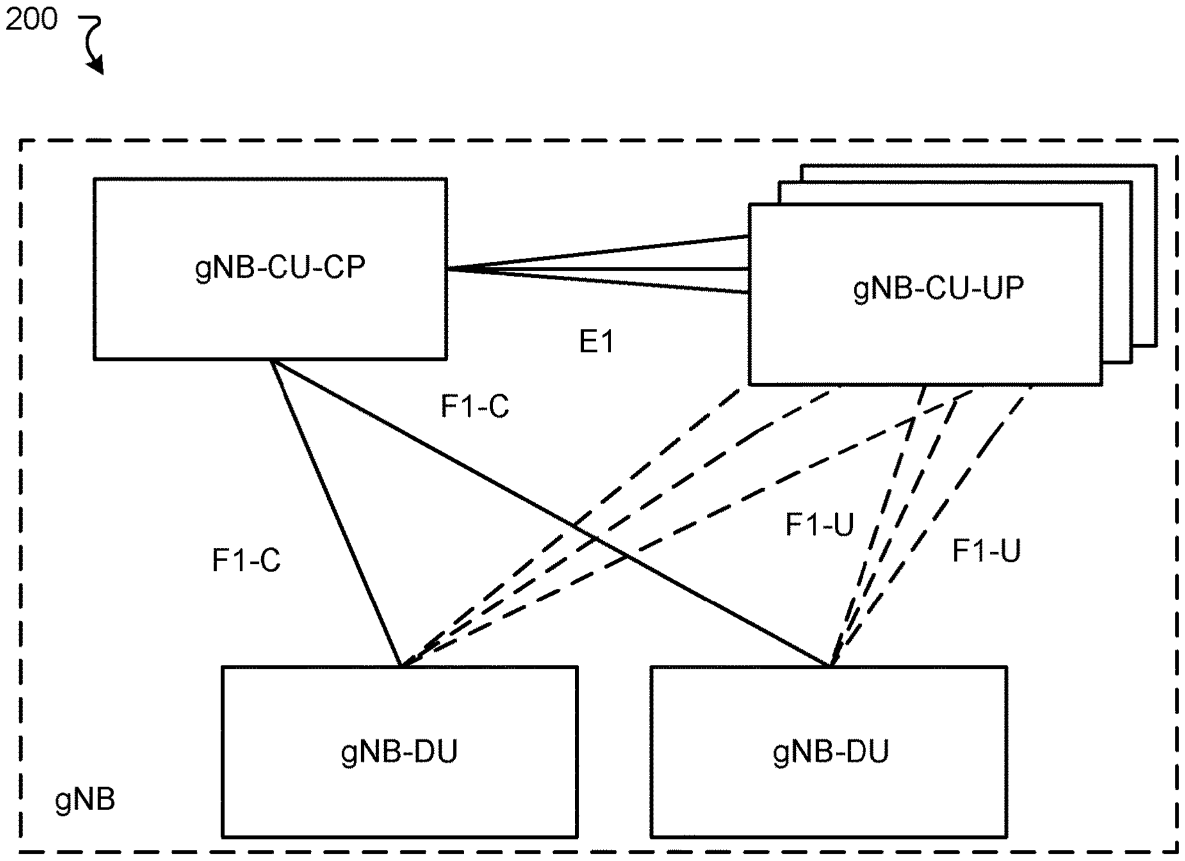
FIG. 2 is a diagram illustrating a disaggregated gNB architecture according to an example implementation.

A disaggregated architecture is defined in the 3GPP standard as a decomposition of a network node (gNB) into multiple logical entities. FIG. 2 illustrates such an architecture 200, in which a gNB has a central unit (gNB-CU) and distributed units (gNB-DUs). As shown in FIG. 2, the gNB-CU itself is split into a control plane component (gNB-CU-CP) and a user plane component (gNB-CU-UP). The gNB-CU-CP is connected to the gNB-CU-UP via an E1 connection, the gNB-DUs are connected to the gNB-CU-CP via a F1-C connection, and the gNB-DUs are connected to the gNB-CU-UP via a F1-U connection.

In such a disaggregated architecture as that shown in FIG. 2, a gNB-DU may host multiple cells up to a maximum of 512 according to current specifications. Accordingly, serving cell change between cells may be considered intra-DU for a serving cell change between cells of the same gNB-DU, and inter-DU between cells of different gNB-DUs.

In conventional approaches to mobility events, a user equipment (UE) reports layer 1 (L1) and layer 3 (L3)

measurements to the gNB-DU and gNB-CU, respectively. L1 beam measurements are reported to MAC layer and used for beam management in the gNB-DU, and are not forwarded to the gNB-CU. In contrast, L3 measurements (i.e., cell measurements including optional beam measurements) are reported using RRC protocol and used for mobility management. The L3 measurements are forwarded to the gNB-CU by the gNB-DU.

Beam changes are managed by gNB-DU and cell changes, regardless of whether the mobility is intra-DU or inter-DU, are triggered/managed by the gNB-CU-CP.

In the conventional approaches to mobility events, the gNB-CU-CP determines the triggering of an L3 mobility procedure based on received L3 measurements. For intra-DU cell changes, this incurs additional time, particularly in a distributed cloud deployment where there is an external F1/E1 interface. For instance after UE sends the measurement report, the measurements have to be forwarded to the CU-CP which will then request and perform the UE context modification at the target cell which belongs to the same gNB-DU, and send an RRCReconfiguration (serving cell change command) to the UE via the gNB-DU. The gNB-DU is then able to forward the serving cell change command to the UE.

Figure 3:
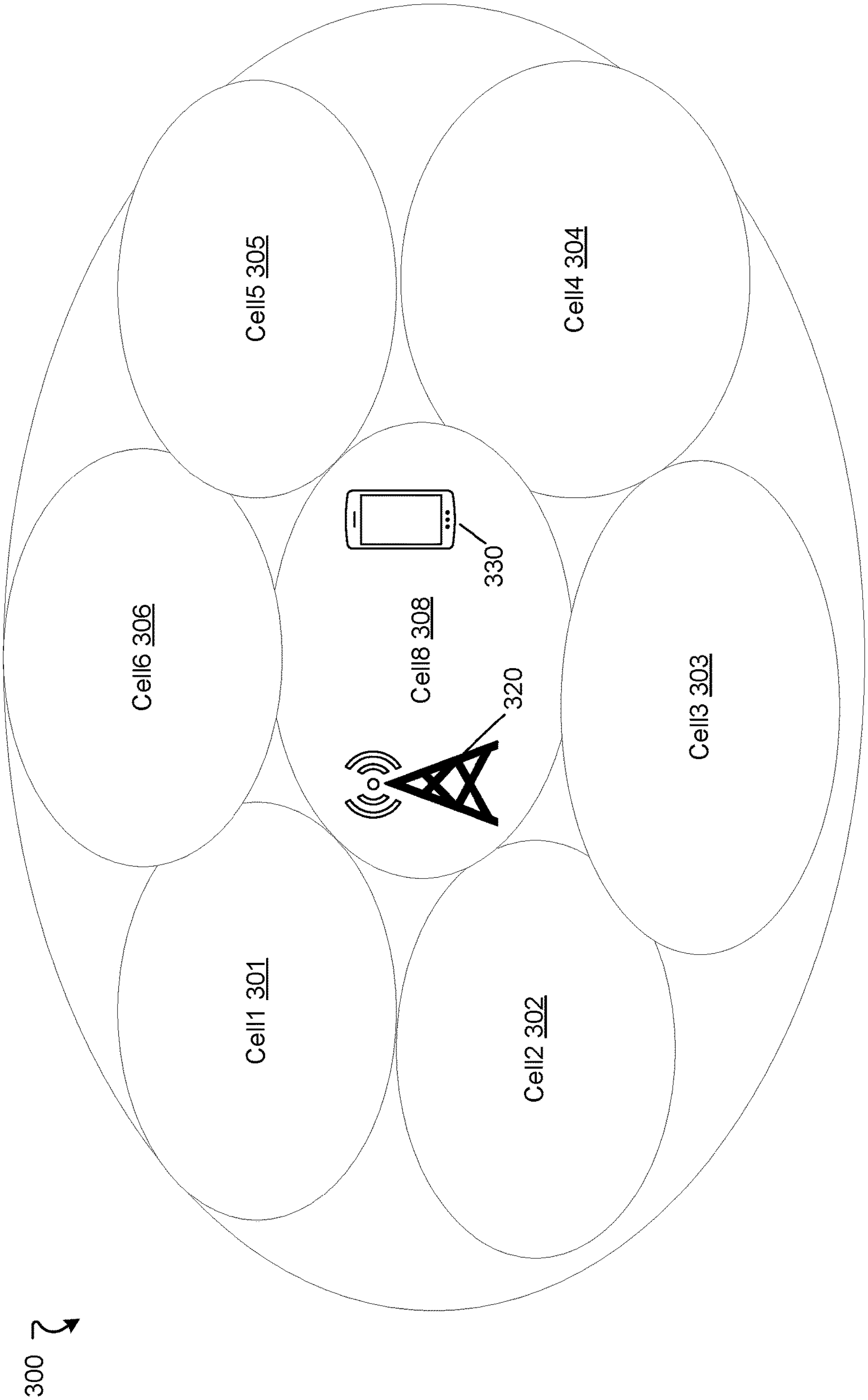
FIG. 3 is a diagram illustrating an intra-gNB-DU deployment, according to an example implementation.

FIG. 3 shows a gNB-DU 300 with intra-frequency cells 301-306 and 308, i.e., cells that operate over the same frequency band. As shown in FIG. 3, a UE 330 moves from Cell1 301 to Cell8 308. Initially, the UE resides at the edge of Cell1 301, then the UE subsequently moves to Cell8 308 and later to the edge of Cell8 308.

- When the UE resides in Cell1 301, the neighbouring cells for the UE are Cell2 302 and Cell8 308.
- When the UE resides in Cell8 308, the neighbouring cells for the UE are Cell6 306 and Cell5 305.

Figure 4:
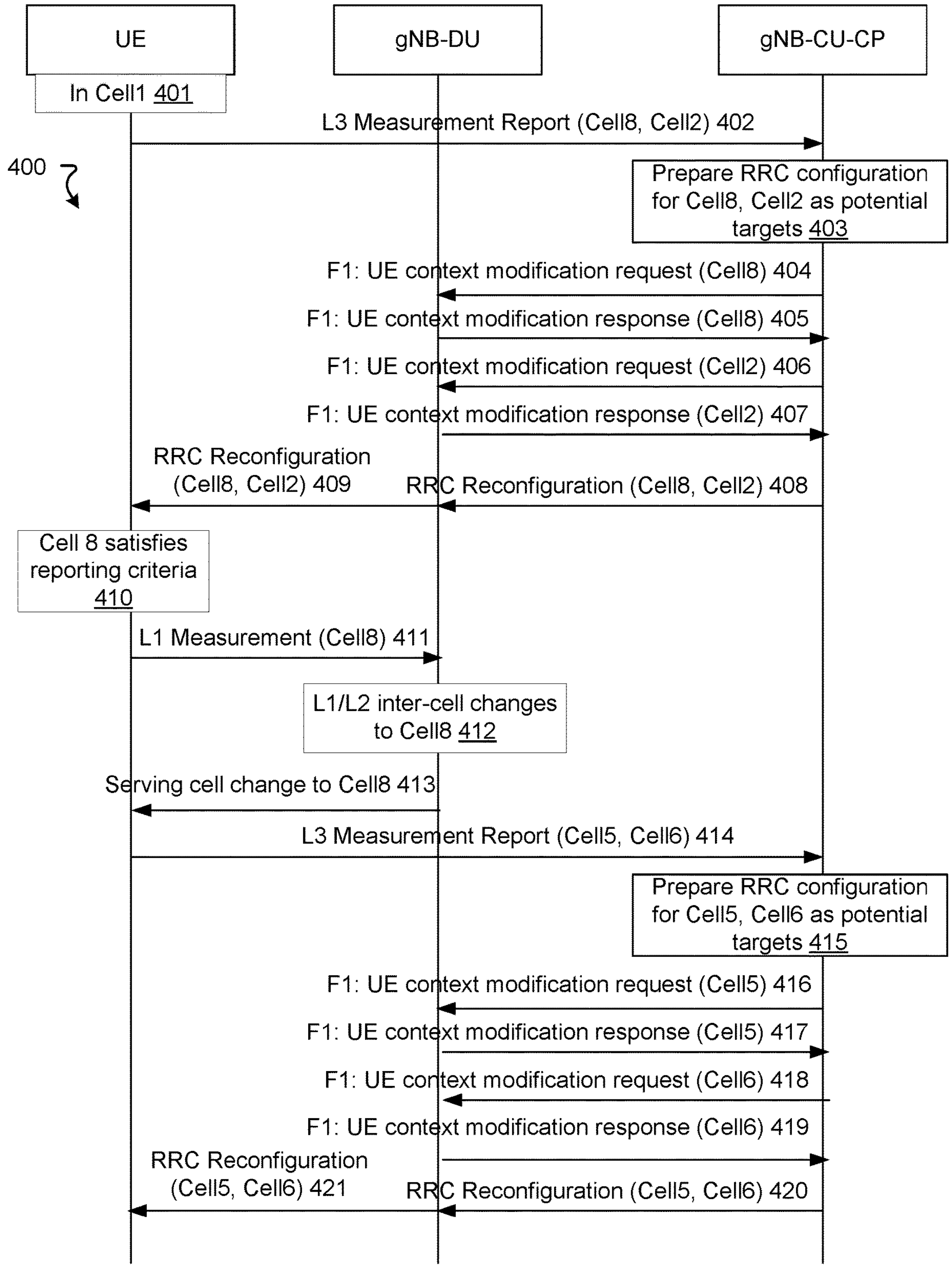
FIG. 4 is a sequence diagram illustrating an intra-gNB-DU L1/L2 centric inter-cell change according to an example implementation.

FIG. 4 is a sequence diagram that illustrates one potential implementation of the target cell configuration and of the respective serving cell change based on L1/L2 measurements (L1/L2 centric mobility) considering current RAN2 understanding.

- The gNB-CU-CP configures the UE for both L1 (e.g., RSRP or RSRQ) and L3 measurements.
  - L3 measurements from UE (402, 414) are sent over RRC protocol to the gNB-CU-CP. This may be used for both intra-gNB-DU and inter-gNB-DU mobility and are normally not conveyed to gNB-DU.
  - L1 RSRP measurements from UE (411) are sent over L1/MAC protocol to the gNB-DU. This may be used for intra-DU mobility by the gNB-DU. (Note that currently (as per Rel-16) gNB-CU is not aware of the L1 measurements as the beam management is only done at gNB-DU level.)
- The gNB-CU-CP provides to the UE (408, 409) one or more cells' configurations of the same DU (based on UE measurements) for L1/L2 centric inter-cell mobility through RRC reconfiguration. This cell information and its configuration may be decided by gNB-DU (and conveyed to gNB-CU) or gNB-CU may also ask the gNB-DU (404, 406, 416, 418) for the configuration pertaining to some cells (based on the L3 measurements), and is then configured to UE by gNB-CU.
- The gNB-DU evaluates the L1 measurement results (412) (e.g., L1-RSRP, L1-RSRQ, indication from UE) and mandates the UE to perform Intra-DU mobility (when the HO criterion is met) using a L2 MAC CE command (413).

Based on UE mobility, the gNB-CU-CP may configure the UE with new target cell configuration, based on new measurement reports. In Cell1, the target cells were Cell8 and Cell2, which are changed to Cell5 and Cell6 after serving cell is changed to Cell8.

- Since this target cell configuration is sent to UE only via RRC protocol, it incurs a lot of signaling, both in the network and with UE. For a UE under mobility it is also latency consuming due to the additional signaling before the handover could be executed and hence slow.
- Moreover, the cells in FIG. 4 are intra-frequency cells and hence have very few differences in their configuration (e.g., PCI, DMRS, etc.). Configuring target cells via RRC configuration may result in issuing full configuration of target cells in each iteration and this is sub-optimal. Such overhead on the air interface and duplicate information could be avoided.
- Even if a delta configuration is feasible in a subsequent cell change, delivering the delta configuration via RRC is expensive and incurs a lot of signaling overhead over both F1 and RRC interfaces. It is noted that a delta configuration is a reduced configuration that expresses only changes to a configuration from that of another, e.g., serving cell. A full configuration, in contrast, is a usual configuration for, e.g., RRC configuration.

In contrast to the above-described conventional approaches to mobility, events, improved techniques of mobility events include generating, by the gNB-CU-CP, preconfigured target cell configurations for all intra-frequency cells of the gNB-DU which reduces the need for subsequent F1:UE Context Modification and RRC Re-configuration procedures to configure cells of the same DU for L1/L2 mobility.

Advantageously, the above-described improved technique for intra and inter gNB-DU mobility provides for more efficient signaling for serving cell change between cells belonging to the same gNB-DU.

According to example implementation, the serving cell change effected by the apparatus is a handover, SCell change or establishment of dual- or multi-connectivity operation.

Figure 5:
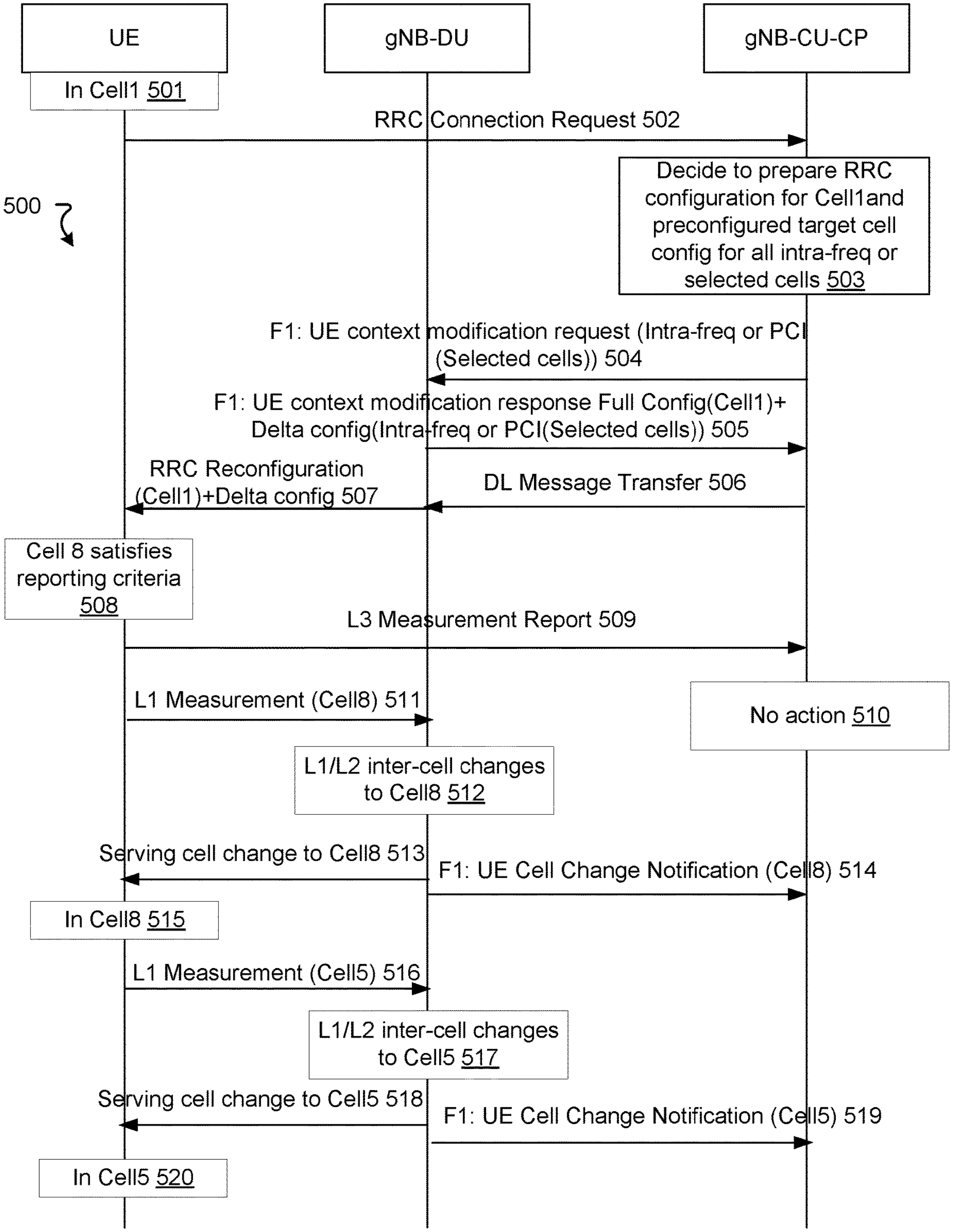
FIG. 5 is a sequence diagram illustrating an optimized L1/L2 centric intra-DU inter-cell change according to an example implementation.

FIG. 5 is an exemplary sequence diagram illustrating an optimized L1/L2 centric intra-DU inter-cell change 500.

At 501, the UE is initially performing network access by Cell1 (see FIG. 3).

At 502, the UE sends a RRC connection request to the gNB-CU-CP as part of an initial access; the connection request may include a L3 measurement report.

At 503, the gNB-CU-CP determines Cell1 to be the serving cell and decides to prepare a RRC configuration for Cell1. The gNB-CU-CP also decides to prepare a preconfigured target cell configuration for at least a subset of the cells associated with the gNB-DU. In some implementations, the subset includes intra-frequency cells, i.e., those cells sharing the same frequency band.

At 504, the gNB-CU-CP sends a F1 UE context modification request to the gNB-DU.

The gNB-CU-CP indicates to the gNB-DU via an indication such as for example, a FLAG to prepare preconfigured target cell configurations (e.g., CellGroupConfig) for some or all intra-frequency cells of the gNB-DU, regardless of having them reported by the UE in the measurement report (e.g., FLAG_ALL_INTRA_DU=TRUE). In some implementations, the preconfigured target cell configurations for some or all intra-frequency cells are prepared as full configurations. In some implementations, the gNB-CU-CP sends a list of intra-DU PCIs for which the delta configurations may be prepared (e.g., PCI(1,2,3,4)). Note that the gNB-CU-CP may request a first (e.g., full) configuration for the selected serving cell and also indicate that the preconfigured target cell configurations are second (e.g., full or delta) configurations of the serving cell. This will ensure that the RRC signaling towards the UE is simplified. In some implementations, the gNB-CU-CP may indicate separately if any full or delta configuration is needed for an inter-frequency cell associated with the same gNB-DU.

At 505, the gNB-DU sends a F1 UE context modification response to the gNB-CU-CP.

The gNB-DU prepares preconfigured target cell configurations of some or all the intra-frequency cells of the gNB-DU without reserving L1/L2 resources at the gNB-DU, unless explicit resource reservation is requested by gNB-CU-CP. In some arrangements, the gNB-CU-CP indicates the list of PCIs that may need resource reservation immediately to the gNB-DU. It is noted that one or more of the preconfigured target cells may not have been reported by the UE, i.e. no visibility to the UE at that moment. It is also noted that the resource reservation is delayed at the gNB-DU until L1 RSRP measurements indicate that a particular cell is better than a predefined threshold. The delta configurations (e.g., Delta Config (All Intra-DU Intra-Freq Cells) are provided in advance, to avoid the signaling overhead at a later stage when the UE is moving. Since the delta configurations are minor and very small in terms of data size, for intra-frequency cells of the same gNB-DU, the additional signaling is very minimal. Nevertheless, this implementation is subject to optimization and the gNB-CU-CP or the gNB-DU may decide to provide configurations for a subset of the cells of the gNB-DU (e.g., PCI(1,2,3,4)).

At 506, the gNB-CU-CP sends a F1 DL RRC MESSAGE TRANSFER to the gNB-DU. In an example, this may include the RRC Reconfiguration message as a container payload inside it. In some implementations, the gNB-CU-CP configures both periodic and event based inter-cell L1 RSRP measurements for the UE to be reported to the DU.

At 507, the gNB-DU sends the RRC Reconfiguration message which includes configuration for the serving cell (Cell1) and Delta Configurations for the Intra-DU Intra-Freq Cells and/or cells with the selected PCIs. In some implementations, 505-507 (i.e., the transmitting of the respective indications, receiving of configuration data, and transmitting of the configuration data to the user equipment) are included in respective single procedures or messages.

At 508, the UE determines that a neighbouring cell, Cell8, satisfies a reporting criterion. In some implementations, the criterion is based on whether a measured reference signal received power (RSRP) is greater than a threshold.

At 509, the UE may send a L3 measurement report to the gNB-CU-CP. It is noted that the RRC Configuration message is not sent to the UE each time there is a L3 measurement indicating a different intra-DU intra-frequency best cell, i.e., one which has satisfied a criteria set by the network, for example, a criterion including exceeding a predefined threshold or satisfying a condition event such as A3/A5 set by network, and is reported by the UE to the network in measurement report. In some implementations, when the UE has been configured with full or delta configuration for a given potential target cell for L1 or L2 centric mobility, the UE may consider the potential target cell as an intra-DU cell and hence does not report L3 measurements for such a cell if, e.g., the entry condition of the measurement event has been for this cell. That is, in such an implementation, the UE would report L3 measurements only if the measurement event is met for a cell for which the UE does not have a valid preconfiguration for L1/L2-centic mobility. In some implementations, the functionality is configured by the network; this feature could be implicitly used to prevent collisions between L1/L2 centric intra-DU inter-cell mobility and L3 based inter-DU mobility. This is applicable when L1/L2 centric mobility is limited to intra-DU scenario.

At 510, the gNB-CU-CP normally selects an action to perform in response to the L3 measurement report. As shown in FIG. 5, the gNB-CU-CP takes no action. Generally, if the gNB-CU-CP receives an L3 measurement report configured for A3/A5 events indicating a cell belonging to the same gNB-DU for which the configuration has already been provided to the UE, the gNB-CU-CP may take no action. Alternatively, if the measurement report is triggered for a target cell that is not controlled by the gNB-DU managing the L1/2 centric mobility, then the gNB-CU-CP may trigger an L3 based handover operation.

At 511, the UE sends a L1 measurement report for Cell8 to the gNB-DU. In some implementations, the UE stores all preconfigurations of the target cells prepared for L1/2 centric mobility sent by the gNB-CU-CP until the UE undergoes a L3 handover or is explicitly indicated by gNB-CU-CP in the RRC Reconfiguration message. When the gNB-DU receives L1 RSRP measurements indicating an intra-DU cell having met a predefined criteria/threshold, the gNB-DU reserves cell resources needed for the UE, if it has not been done already.

At 512, the gNB-DU reserves L1/L2 resources for the potential target cell (Cell8). It is noted that the resource reservation is delayed at the gNB-DU until L1 RSRP measurements indicate that a particular cell is better than a predefined threshold.

At 513, the gNB-DU sends a MAC CE command to the UE; the command is for the UE to change its serving cell to Cell8 from Cell1. In some implementations, each time the UE performs a serving cell change via L1/L2 measurements and MAC CE command, the gNB-DU may inform the gNB-CU-CP about this change; this enables the gNB-CU-CP to be aware of the exact UE's exact cell, which may be needed for paging functionality.

At 514, the gNB-DU sends a F1 message to the gNB-CU-CP informing the gNB-CU-CP of the cell change.

At 515, the UE is being served by Cell8.

At 516, the UE sends a L1 measurement report for Cell5 to the gNB-DU. In some implementations, the UE stores all preconfigurations of the target cells prepared for L1/2 centric mobility sent by the gNB-CU-CP until the UE undergoes a L3 handover or is explicitly indicated by gNB-CU-CP in the RRC Reconfiguration message. When the gNB-DU receives L1 RSRP measurements indicating an intra-DU cell having met a predefined criteria/threshold, the gNB-DU reserves cell resources needed for the UE.

At 517, the gNB-DU reserves L1/L2 resources for the potential target cell (Cell5). It is noted that the resource reservation is delayed at the gNB-DU until L1 RSRP measurements indicate that a particular cell is better than a predefined threshold.

At 518, the gNB-DU sends a MAC CE command to the UE; the command is for the UE to change its serving cell to Cell5 from Cell8. In some implementations, each time the UE performs a serving cell change via L1/L2 measurements and MAC CE command, the gNB-DU may inform the gNB-CU-CP about this change; this enables the gNB-CU-CP to be aware of the exact UE's exact cell, which may be needed for paging functionality.

At 519, the gNB-DU sends a F1 message to the gNB-CU-CP informing the gNB-CU-CP of the cell change.

At 520, the UE is being served by Cell5.

Figure 6:
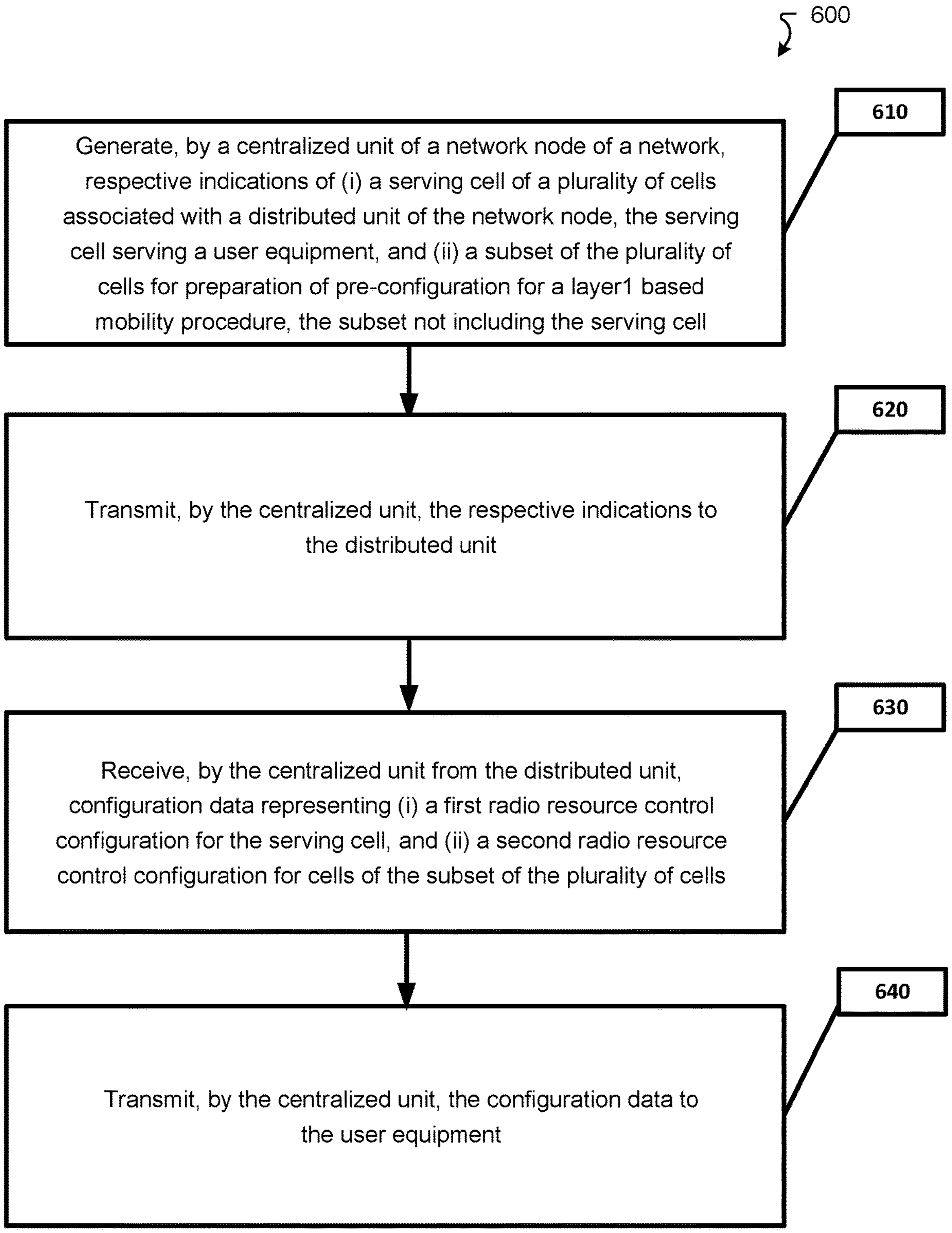
FIG. 6 is a flow chart illustrating an intra-gNB-DU inter-cell mobility process according to an example implementation.

Example 1-1: FIG. 6 is a flow chart illustrating an example method 600 of performing mobility. Operation 610 includes generating, by a centralized unit of a network node of a network, respective indications of (i) a serving cell of a plurality of cells associated with a distributed unit of the network node, the serving cell serving a user equipment, and (ii) a subset of the plurality of cells for preparation of preconfiguration for a layer 1 based mobility procedure, the subset not including the serving cell. Operation 620 includes transmitting, by the centralized unit, the respective indications to the distributed unit. Operation 630 includes receiving, by the centralized unit from the distributed unit, configuration data including (i) a first configuration for the serving cell, and (ii) a second configuration for cells of the subset of the plurality of cells. Operation 640 includes transmitting, by the centralized unit, the configuration data to the user equipment.

Example 1-2: According to an example implementation of Example 1-1, further comprising receiving, by the centralized unit, a request to access the network from a cell of the plurality of cells. In an example embodiment, the request may specify a cell of the network node.

Example 1-3: According to an example implementation of Example 1-2, wherein the request is received from the user equipment during an initial access to the network node.

Example 1-4: According to an example implementation of Examples 1-2 and 1-3, wherein the request is received during a mobility operation to a cell of the plurality of cells.

Example 1-5: According to an example implementation of Examples 1-1 to 1-4, wherein the subset of the plurality of cells are configured with a common frequency band.

Example 1-6: According to an example implementation of Example 1-5, wherein at least one cell of the subset of the plurality of cells is configured with a frequency band different from that of another cell of the subset, and wherein the preconfigured target cell configurations for the subset include a full configuration for the at least one cell.

Example 1-7: According to an example implementation of Examples 1-1 to 1-6, wherein the configuration data further includes a configuration of the user equipment such that the user equipment reports inter-cell layer one measurements to the distributed unit.

Example 1-8: According to an example implementation of Example 1-7, wherein the indication information causes the distributed unit to be triggered to allocate layer one/layer two resources in response to an inter-cell layer one measurement being greater than a threshold.

Example 1-9: According to an example implementation of Examples 1-1 to 1-8, further comprising receiving, from the distributed unit, an indication that the user equipment has changed its serving cell to a target cell, the indication including an identifier identifying the target cell; and performing or not performing a handover operation based on the target cell.

Example 1-10: According to an example implementation of Example 1-9, wherein performing or not performing the handover operation includes determining, based on the indication, whether the target cell is served by the distributed unit.

Example 1-11: According to an example implementation of Examples 1-9 to 1-10, wherein performing or not performing the handover operation includes determining, based on the indication, a current serving cell serving the user equipment.

Example 1-12: According to an example implementation of Examples 1-1 to 1-11, transmitting of the respective indications, receiving of configuration data, and transmitting of the configuration data to the user equipment are included in respective single procedures or messages.

Example 1-13: According to an example implementation of Examples 1-1 to 1-12, wherein the first configuration is a full configuration, and wherein the second configuration is a delta configuration.

Example 1-14: An apparatus comprising means for performing a method of any of Examples 1-1 to 1-13.

Example 1-15: A computer program product including a non-transitory computer-readable storage medium and storing executable code that, when executed by at least one data processing apparatus, is configured to cause the at least one data processing apparatus to perform a method of any of Examples 1-1 to 1-13.

Figure 7:
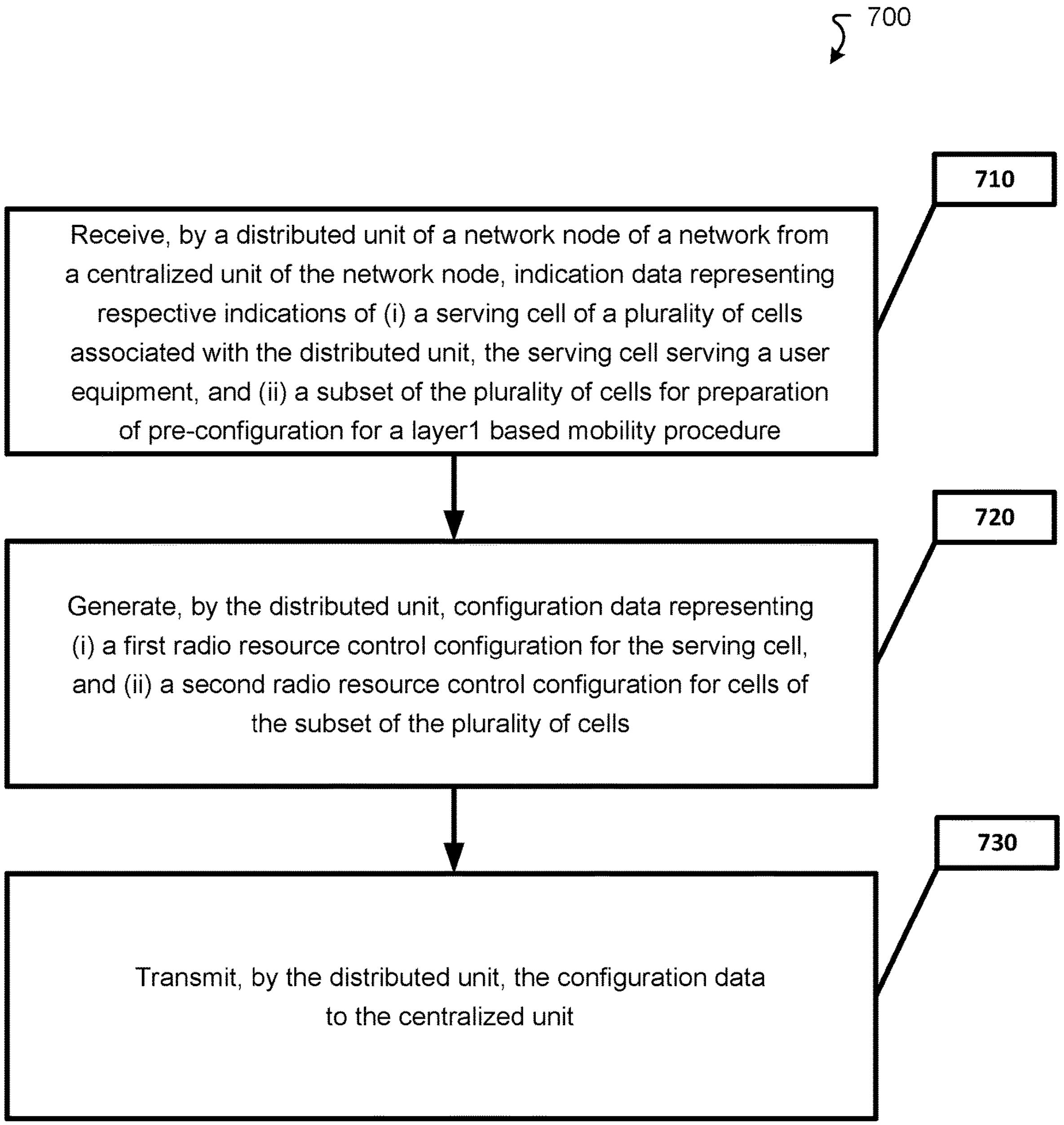
FIG. 7 is a flow chart illustrating an intra-gNB-DU inter-cell mobility process according to an example implementation.

Example 2-1: FIG. 7 is a flow chart illustrating a process 700 of performing mobility. Operation 710 includes receiving, by a distributed unit of a network node of a network from a centralized unit of the network node, indication data including respective indications of (i) a serving cell of a plurality of cells associated with the distributed unit, the serving cell serving a user equipment, and (ii) a subset of the plurality of cells for preparation of preconfiguration for a layer 1 based mobility procedure, the subset not including the serving cell. Operation 720 includes generating, by the distributed unit, configuration data including (i) a first configuration for the serving cell, and (ii) a second configuration for cells of the subset of the plurality of cells. Operation 730 includes transmitting, by the distributed unit, the configuration data to the centralized unit.

Example 2-2: According to an example implementation of Example 2-1, wherein at least one cell of the plurality of cells is configured with a frequency band different from that of another cell of the subset, and wherein the configuration data includes a full configuration for the at least one cell.

Example 2-3: According to an example implementation of Examples 2-1 or 2-2, wherein the configuration data further includes a configuration of the user equipment such that the user equipment reports inter-cell layer one measurements to the distributed unit.

Example 2-4: According to an example implementation of Example 2-3, wherein the indication information causes the distributed unit to be triggered to allocate layer one/layer two resources in response to an inter-cell layer one measurement being greater than a threshold.

Example 2-5: According to an example implementation of Examples 2-1 to 2-4, further comprising transmitting, to the centralized unit, a notification that the user equipment has changed its serving cell to the target cell.

Example 2-6: According to an example implementation of Example 2-1, receiving of the indication data, and transmitting of configuration data are included in respective single procedures or messages.

Example 2-7: According to an example implementation of Examples 2-1 to 2-6, wherein the first configuration is a full configuration, and wherein the second configuration is a delta configuration.

Example 2-8: An apparatus comprising means for performing a method of any of Examples 2-1 to 2-7.

Example 2-9: A computer program product including a non-transitory computer-readable storage medium and storing executable code that, when executed by at least one data processing apparatus, is configured to cause the at least one data processing apparatus to perform a method of any of Examples 2-1 to 2-7.

Figure 8:
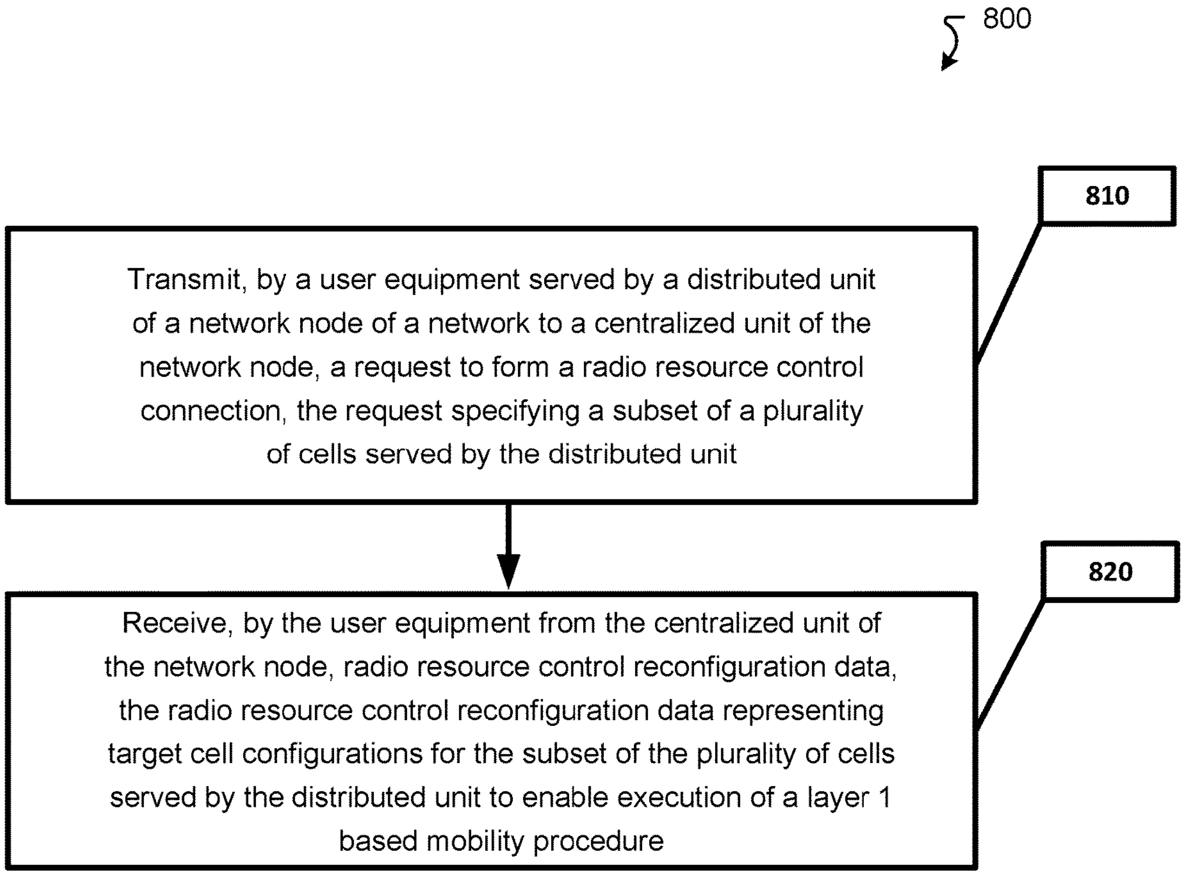
FIG. 8 is a flow chart illustrating an intra-gNB-DU inter-cell mobility process according to an example implementation.

Example 3-1: FIG. 8 is a flow chart illustrating a process 800 of performing mobility. Operation 810 includes transmitting, by a user equipment to a network node, a request to form a radio resource control connection. Operation 820 includes receiving, by the user equipment from the network node, radio resource control reconfiguration data, the radio resource control reconfiguration data including target cell configurations for a plurality of cells served by a distributed unit of the network node to enable execution of a layer 1 based mobility procedure. In an example embodiment, the request may specify a cell of the network node.

Example 3-2: According to an example implementation of Example 3-1, wherein the target cell configurations include a full configuration for a cell of the plurality of cells, the cell serving the user equipment.

Example 3-3: According to an example implementation of Example 3-2, wherein the target cell configurations include delta configurations for other cells of the plurality of cells.

Example 3-4: According to an example implementation of Examples 3-2 to 3-3, wherein at least one cell of the plurality of cells is configured with a frequency band different from that of another cell of the plurality of cells, and wherein the target cell configurations may include a full configuration for the at least one cell.

Example 3-5: According to an example implementation of Example 3-1, receiving of the radio resource control reconfiguration data including target cell configurations for the plurality of cells served by the distributed unit of the network node is included in a single procedure or message.

Example 3-6: An apparatus comprising means for performing a method of any of Examples 3-1 to 3-5.

Example 3-7: A computer program product including a non-transitory computer-readable storage medium and storing executable code that, when executed by at least one data processing apparatus, is configured to cause the at least one data processing apparatus to perform a method of any of Examples 3-1 to 3-5.

In summary, technical effects of the above-described improvement include the following:

- Reduced signaling overhead to the UE so as to provide the RRC configurations.
- Reduced signaling overhead in the F1 interface for the L1/L2 mobility because of the combined F1 UE context modification response.
- Reduced signaling overhead in the F1 interface for the L1/L2 mobility because cell change message can be very small.

List of Example Abbreviations

Figure 9:
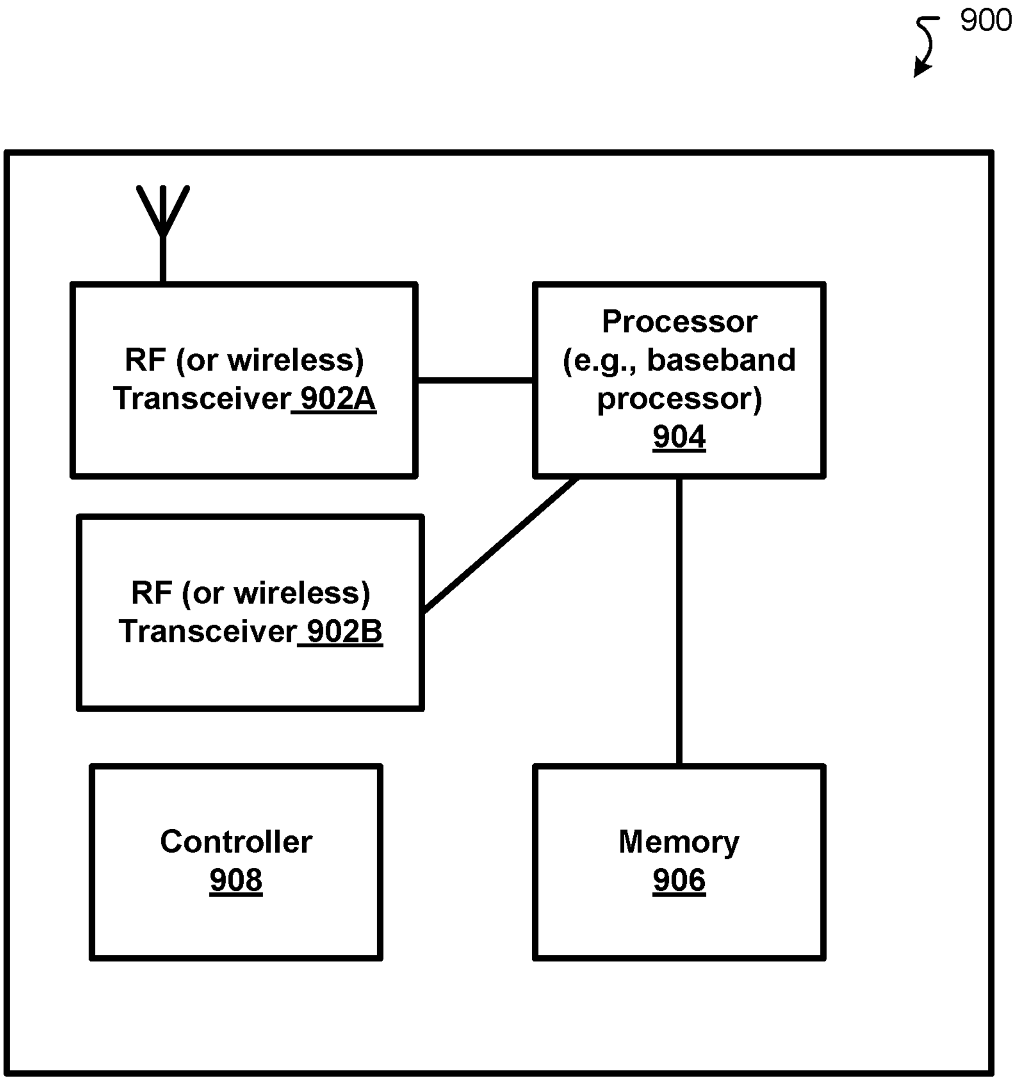
FIG. 9 is a block diagram of a node or wireless station (e.g., base station/access point, relay node, or mobile station/user device) according to an example implementation.

CP Control Plane
CU Central Unit
DL Downlink
DMRS Demodulation Reference Signal
DU Distributed Unit
HO Handover
MAC CE Medium Access Control Control Element
PCell Primary Cell
PCI Physical Cell Identity
PDCCH Physical Downlink Control Channel
PDSCH Physical Downlink Shared Channel
PUCCH Physical Uplink Control Channel
PUSCH Physical Uplink Shared Channel
RRC Radio Resource Control
RRM Radio Resource Management
RSRP Reference Signal Receive Power
SCell Secondary Cell
TCI Transmission Configuration Indicator
TRP Transmission Reception Point
UE User Equipment
UL Uplink FIG. 9 is a block diagram of a wireless station (e.g., AP, BS, e/gNB, NB-IoT UE, UE or user device) 900 according to an example implementation. The wireless station 900 may include, for example, one or multiple RF (radio frequency) or wireless transceivers 902A, 902B, where each wireless transceiver includes a transmitter to transmit signals (or data) and a receiver to receive signals (or data). The wireless station also includes a processor or control unit/entity (controller) 904 to execute instructions or software and control transmission and receptions of signals, and a memory 906 to store data and/or instructions.

Processor 904 may also make decisions or determinations, generate slots, subframes, packets or messages for transmission, decode received slots, subframes, packets or messages for further processing, and other tasks or functions described herein. Processor 904, which may be a baseband processor, for example, may generate messages, packets, frames or other signals for transmission via wireless transceiver 902 (902A or 902B). Processor 904 may control transmission of signals or messages over a wireless network, and may control the reception of signals or messages, etc., via a wireless network (e.g., after being down-converted by wireless transceiver 902, for example). Processor 904 may be programmable and capable of executing software or other instructions stored in memory or on other computer media to perform the various tasks and functions described above, such as one or more of the tasks or methods described above. Processor 904 may be (or may include), for example, hardware, programmable logic, a programmable processor that executes software or firmware, and/or any combination of these. Using other terminology, processor 904 and transceiver 902 together may be considered as a wireless transmitter/receiver system, for example.

In addition, referring to FIG. 9, a controller (or processor) 908 may execute software and instructions, and may provide overall control for the station 900, and may provide control for other systems not shown in FIG. 9 such as controlling input/output devices (e.g., display, keypad), and/or may execute software for one or more applications that may be provided on wireless station 900, such as, for example, an email program, audio/video applications, a word processor, a Voice over IP application, or other application or software.

In addition, a storage medium may be provided that includes stored instructions, which when executed by a controller or processor may result in the processor 904, or other controller or processor, performing one or more of the functions or tasks described above.

According to another example implementation, RF or wireless transceiver(s) 902A/902B may receive signals or data and/or transmit or send signals or data. Processor 904 (and possibly transceivers 902A/902B) may control the RF or wireless transceiver 902A or 902B to receive, send, broadcast or transmit signals or data.

The embodiments are not, however, restricted to the system that is given as an example, but a person skilled in the art may apply the solution to other communication systems. Another example of a suitable communications system is the 5G concept. It is assumed that network architecture in 5G will be quite similar to that of the LTE-advanced. 5G uses multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilise network functions virtualization (NFV)

which is a network architecture concept that proposes virtualizing network node functions into “building blocks” or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Implementations may also be provided on a computer readable medium or computer readable storage medium, which may be a non-transitory medium. Implementations of the various techniques may also include implementations provided via transitory signals or media, and/or programs and/or software implementations that are downloadable via the Internet or other network(s), either wired networks and/or wireless networks. In addition, implementations may be provided via machine type communications (MTC), and also via an Internet of Things (IOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer, or it may be distributed amongst a number of computers.

Furthermore, implementations of the various techniques described herein may use a cyber-physical system (CPS) (a system of collaborating computational elements controlling physical entities). CPS may enable the implementation and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various implementations of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, implementations may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall as intended in the various embodiments.

What is claimed is:

1. An apparatus, comprising:

at least one processor; and at least one memory storing instructions that, when executed by the at least one processor, cause the apparatus at least to:

operate as a control-plane centralized unit (gNB-CU-CP) of a gNB comprising a distributed unit (gNB-DU), that hosts a plurality of intra-frequency cells including a first cell and a second cell;

receive, during initial access of a user equipment via the first cell, a radio resource control connection request including a layer 3 measurement report;

generate, by the gNB-CU-CP, respective indications of (i) a serving cell of the plurality of cells associated with the gNB-DU, the serving cell serving the user equipment, and (ii) a subset of the plurality of cells for preparation of preconfiguration for a layer 1 based mobility procedure, the subset not including the serving cell, wherein the serving cell is the first cell, wherein the subset comprises all intra-frequency cells of the gNB-DU other than the first cell, including the second cell, and wherein the respective indications include a flag indicating that preconfigured target cell configurations are to be prepared for all intra-DU intra-frequency cells regardless of whether the all intra-DU intra-frequency cells were reported by the user equipment in the layer 3 measurement report;

transmit, by the gNB-CU-CP, the respective indications to the gNB-DU in a single F1 user-equipment context modification request;

receive, by the gNB-CU-CP from the gNB-DU in a single F1 user-equipment context modification response, configuration data including (i) a first configuration for the serving cell, and (ii) a second configuration for cells of the subset of the plurality of cells, wherein the first configuration comprises a full CellGroupConfig for the first cell, wherein the second configuration comprises delta configurations for the all intra-DU intra-frequency cells other than the first cell, and wherein the delta configurations are prepared without reserving layer 1/layer 2 resources at the gNB-DU for the all intra-DU intra-frequency cells;

transmit, by the gNB-CU-CP, the configuration data to the user equipment in a single radio resource control reconfiguration message carried in an F1 downlink radio resource control message transfer to the gNB-DU, wherein the radio resource control reconfiguration message configures the user equipment with both periodic and event-based inter-cell layer 1 reference signal received power measurements to be reported to the gNB-DU;

receive, after transmitting the configuration data, a layer 3 measurement report indicating that the second cell satisfies a measurement event;

determine that the second cell belongs to the same gNB-DU and has already been provided to the user equipment as one of the delta configurations;

take no radio resource control reconfiguration action in response to the layer 3 measurement report indicating the second cell; and receive, from the gNB-DU, an F1 message indicating that the user equipment has changed its serving cell from the first cell to the second cell after the gNB-DU received a layer 1 reference signal received power measurement for the second cell, reserved layer 1/layer 2 resources for the second cell, and transmitted a medium access control control element command causing the user equipment to change its serving cell from the first cell to the second cell.

2. A method, comprising:

operating as a control-plane centralized unit (gNB-CU-CP) of a gNB comprising a distributed unit (gNB-DU), that hosts a plurality of intra-frequency cells including a first cell and a second cell;

receiving, during initial access of a user equipment via the first cell, a radio resource control connection request including a layer 3 measurement report;

generating, by the gNB-CU-CP, respective indications of (i) a serving cell of the plurality of cells associated with the gNB-DU, the serving cell serving the user equipment, and (ii) a subset of the plurality of cells for preparation of preconfiguration for a layer 1 based mobility procedure, the subset not including the serving cell, wherein the serving cell is the first cell, wherein the subset comprises all intra-frequency cells of the gNB-DU other than the first cell, including the second cell, and wherein the respective indications include a flag indicating that preconfigured target cell configurations are to be prepared for all intra-DU intra-frequency cells regardless of whether the all intra-DU intra-frequency cells were reported by the user equipment in the layer 3 measurement report;

transmitting, by the gNB-CU-CP, the respective indications to the gNB-DU in a single F1 user-equipment context modification request;

receiving, by the gNB-CU-CP from the gNB-DU in a single F1 user-equipment context modification response, configuration data including (i) a first configuration for the serving cell, and (ii) a second configuration for cells of the subset of the plurality of cells, wherein the first configuration comprises a full CellGroupConfig for the first cell, wherein the second configuration comprises delta configurations for the all intra-DU intra-frequency cells other than the first cell, and wherein the delta configurations are prepared without reserving layer 1/layer 2 resources at the gNB-DU for the all intra-DU intra-frequency cells;

transmitting, by the gNB-CU-CP, the configuration data to the user equipment in a single radio resource control reconfiguration message carried in an F1 downlink radio resource control message transfer to the gNB-DU, wherein the radio resource control reconfiguration message configures the user equipment with both periodic and event-based inter-cell layer 1 reference signal received power measurements to be reported to the gNB-DU;

receiving, after transmitting the configuration data, a layer 3 measurement report indicating that the second cell satisfies a measurement event;

determining that the second cell belongs to the same gNB-DU and has already been provided to the user equipment as one of the delta configurations;

taking no radio resource control reconfiguration action in response to the layer 3 measurement report indicating the second cell; and receiving, from the gNB-DU, an F1 message indicating that the user equipment has changed its serving cell from the first cell to the second cell after the gNB-DU received a layer 1 reference signal received power measurement for the second cell, reserved layer 1/layer 2 resources for the second cell, and transmitted a medium access control control element command causing the user equipment to change its serving cell from the first cell to the second cell.

3. The method of claim 2, wherein the radio resource control connection request specifies an identifier of the first cell as a cell through which the user equipment requests access to the gNB.

4. The method of claim 3, wherein the flag comprises a FLAG_ALL_INTRA_DU indication set to TRUE.

5. The method of claim 4, wherein the respective indications further include a list of physical cell identities corresponding to the all intra-DU intra-frequency cells other than the first cell for which the delta configurations are to be prepared.

6. The method of claim 5, wherein each of the delta configurations expresses only one or more changes relative to the full CellGroupConfig for the first cell.

7. The method of claim 6, wherein the one or more changes comprise at least one of a physical cell identity or a demodulation reference signal configuration for a corresponding intra-DU intra-frequency cell.

8. The method of claim 7, wherein the radio resource control reconfiguration message causes the user equipment to store the delta configurations until the user equipment undergoes a layer 3 handover or until the gNB-CU-CP explicitly indicates release of the delta configurations in a subsequent radio resource control reconfiguration message.

9. The method of claim 8, wherein the layer 1 reference signal received power measurement for the second cell satisfies a predefined threshold before the gNB-DU reserves the layer 1/layer 2 resources for the second cell.

10. The method of claim 9, wherein the F1 message indicating that the user equipment has changed its serving cell includes an identifier of the second cell, and wherein the instructions, when executed by the at least one processor, cause the apparatus at least to update current serving-cell information for the user equipment based on the identifier of the second cell.

11. The method of claim 10, wherein the current serving-cell information is maintained by the gNB-CU-CP for paging of the user equipment.

12. The method of claim 11, further comprising refraining from initiating a layer 3 handover operation for the user equipment based on determining that the second cell is served by the same gNB-DU and has already been provided to the user equipment as one of the delta configurations.

* * * * *